United States Patent
Connolly et al.

(10) Patent No.: US 6,346,894 B1
(45) Date of Patent: Feb. 12, 2002

(54) METHOD AND SYSTEM FOR INTELLIGENT TEXT ENTRY ON A NUMERIC KEYPAD

(75) Inventors: Dennis Connolly, Wheaton; David H. Lundy, St. Charles, both of IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/414,303

(22) Filed: Oct. 6, 1999

Related U.S. Application Data

(63) Continuation of application No. 08/806,724, filed on Feb. 27, 1997, now Pat. No. 6,005,495.

(51) Int. Cl.[7] .................. H03K 17/94; H03M 11/00
(52) U.S. Cl. .................. 341/22; 341/23; 345/168; 379/88.01; 379/93.27; 704/271
(58) Field of Search .................. 341/20, 22, 23; 379/93.18, 93.27, 88.11, 88.01; 345/168, 141; 704/271, 237, 260

(56) References Cited

U.S. PATENT DOCUMENTS

| | | |
|---|---|---|
| 4,727,357 A | 2/1988 | Curtin et al. |
| 4,737,980 A | 4/1988 | Curtin et al. |
| 4,866,759 A | 9/1989 | Riskin |
| 5,031,206 A | 7/1991 | Riskin |
| 5,062,070 A | 10/1991 | Lapeyre |
| 5,117,455 A | 5/1992 | Danish |
| 5,184,315 A | 2/1993 | Lapeyre |
| 5,200,988 A | 4/1993 | Riskin |
| 5,392,338 A | 2/1995 | Danish et al. |
| 5,911,485 A * | 6/1999 | Rossmann ............... 341/22 |
| 5,952,942 A * | 9/1999 | Balakrishnan et al. ...... 341/22 |
| 5,953,541 A * | 9/1999 | King et al. ............. 395/887 |
| 6,307,548 B1 * | 10/2001 | Flinchem et al. ........ 341/22 |

OTHER PUBLICATIONS

"Probabilistic Characer Disambiguation for Reduced Keyboards Using Text Samples", J. L. Arnott and M. Y. Javed, Augmentative and Alternative Communication, pp. 215–223; 09/92.

* cited by examiner

*Primary Examiner*—Timothy Edwards
(74) *Attorney, Agent, or Firm*—Brinks Hofer Gilson & Lione

(57) ABSTRACT

A method and system for intelligent text entry on a keypad. First, a user selects a key on a keypad. Then, an application predicts which character of those corresponding to that key is intended by the user. The predicted character is then presented to the user for confirmation. If the user confirms the selection, the character is stored. If the user rejects the character, the application presents a new character to the user until a character is finally confirmed. It is only when the predicted character is not the intended character that the user is required to iterate through character choices.

17 Claims, 15 Drawing Sheets

METHOD AND SYSTEM FOR INTELLIGENT TEXT ENTRY ON A NUMERIC KEYPAD

This application is a continuation of U.S. application Ser. No. 08/806,724, filed Feb. 27, 1997 (now U.S. Pat. No. 6,005,495), which is hereby incorporated by reference herein.

TECHNICAL FIELD

The present invention relates generally to entering characters on a numeric keypad such as a telephone touch-tone keypad.

BACKGROUND OF THE INVENTION

On numeric keypads, such as telephone touch-tone keypads, a single key corresponds to multiple characters. For example, on a typical telephone touch-tone keypad, the "2" key corresponds to the letters "A", "B", and "C".

Many applications require a user to enter character information on a keypad. To do this, the user presses the key associated with the desired character. Since each key represents several characters, the application must determine which of these characters is intended by the user. This is often accomplished by allowing the user to iterate though the possible characters by pressing the corresponding key multiple times. For example, to enter the letter "C", the user would press the "2" key three times. To enter the letter "B", the user would press the "2" key twice. In other approaches, a special key (e.g., the "#" key) is pressed to iterate though the choices. Each time the key is pressed, the corresponding letter may be presented to the user (e.g., via voice prompt).

Typically in these approaches, the iteration through characters starts with the first character of the group. For example, if the "2" key is pressed, iteration starts at "A", and if the "3" key is pressed, iteration starts at "D". Accordingly, for at least two-thirds of the characters entered on the keypad, multiple key presses are required. It is well known that using this technique to enter entire words and sentences is a tedious, error-prone, and generally unpleasant experience for the user, resulting in very limited deployment of applications requiring text entry on devices using numeric keypads (e.g., telephones).

There is a need to provide an improved method for entering characters on a numeric keypad that overcomes these problems.

DETAILED DESCRIPTION OF THE PRESENTLY PREFERRED EMBODIMENTS

System Overview

Figure 2:
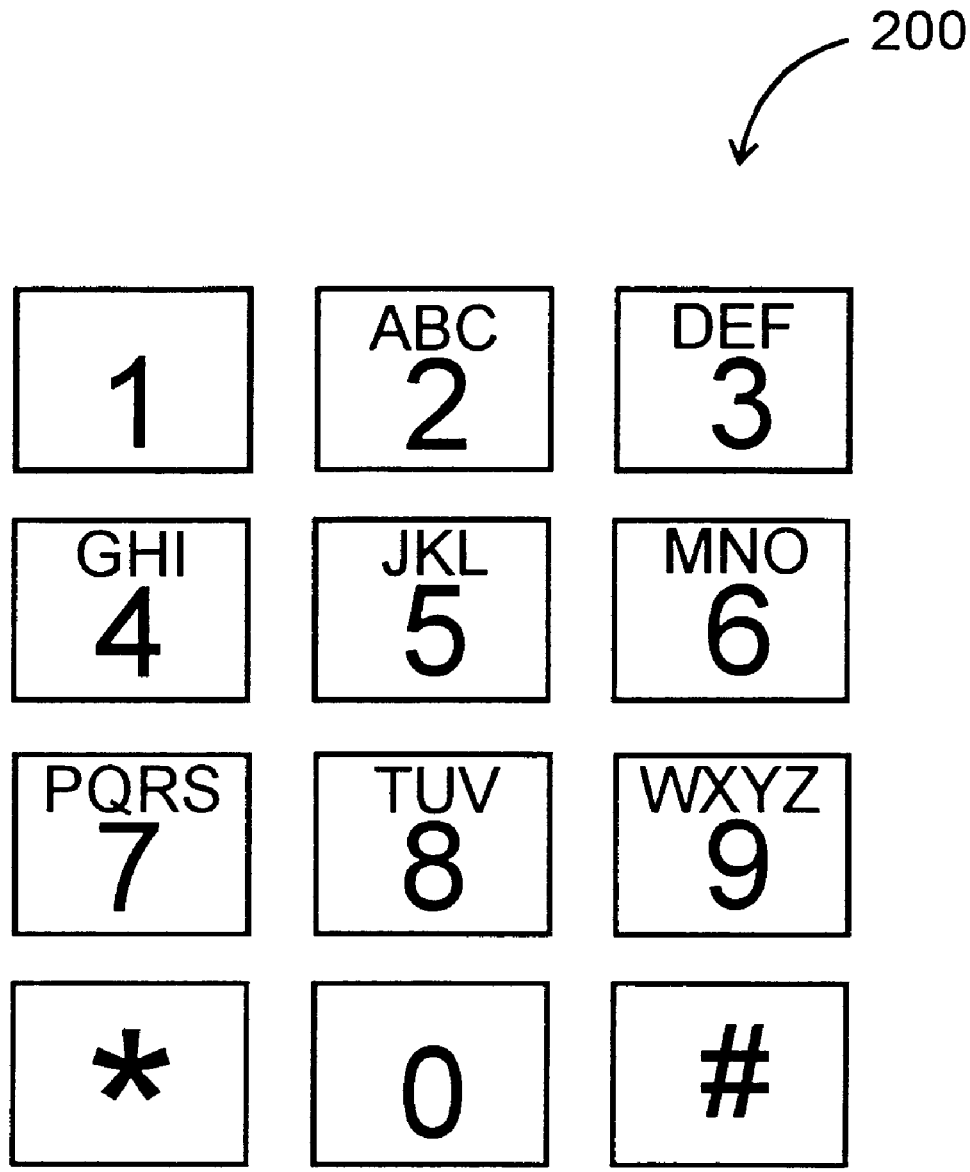
FIG. 2 is an illustration of a prior art numeric keypad that may be used with a preferred embodiment of the present invention.
Figure 3:
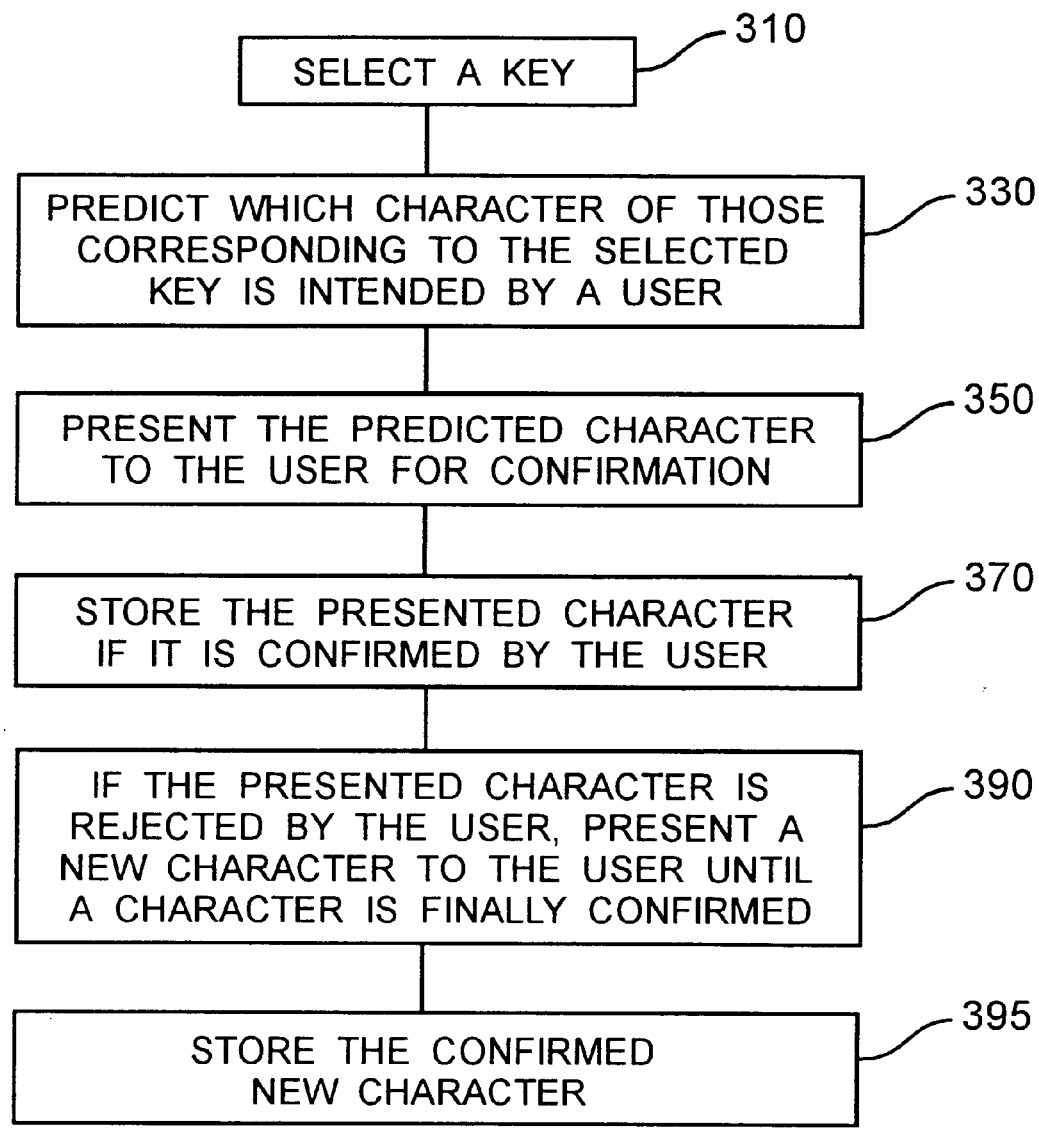
FIG. 3 is a flow chart of a method used in a preferred embodiment.

The embodiments described below can be used where characters are represented by keys and where there are fewer keys than characters. A standard telephone 100 (FIG. 1) having a keypad like keypad 200 of FIG. 2 is merely one example. The embodiments described below each implement the general method illustrated in FIG. 3. First, a user selects a key on a keypad (Step 310). Then, an application makes a context-sensitive prediction as to which character of those corresponding to the selected key is intended by the user (Step 330). There are several ways to make a context-sensitive prediction. One way is to generate several context n-grams, one context n-gram for each character associated with the selected key. Each context n-gram comprises a number of previously-confirmed characters and one of the characters associated with the selected key. The number of times that each context n-gram was encountered in a sample text is determined by using a statistical model, and the character belonging to the context n-gram that was encountered most in the sample text is designated as the predicted character.

The predicted character is then presented to the user for confirmation (Step 350). If the user confirms the selection, the character is stored (Step 370). If the user rejects the character, the application presents a new character to the user until a character is finally confirmed (Step 390). The confirmed character is then stored (Step 395). Accordingly, it is only when the predicted character is not the intended character that the user is required to iterate through character choices.

This general method has several advantages. One advantage is that a character may be entered using fewer keystrokes than with the prior art methods described above. As long as the predicted character is correct, the user may type words or sentences by hitting a single key per character as he would on a standard typewriter keyboard.

Another advantage is that less concentration is required to enter a string of characters.

An additional advantage is that the ability to easily enter arbitrary text enables a much larger class of applications, such as using a standard telephone to create custom messages on alpha-numeric pagers.

Selecting a Key (Step 310)

The first step in the general method of the preferred embodiments is selecting a key. Typically, the user depresses a desired key on a numeric keypad. The numeric keypad is typically part of a standard telephone or screen phone. Other ways of selecting a key can be used.

The selected key can correspond to a set of characters. For example, in the keypad 200 of FIG. 2, the "5" key corresponds to the characters "J", "K", and "L".

Predicting the Intended Character (Step 330)

Figure 4:
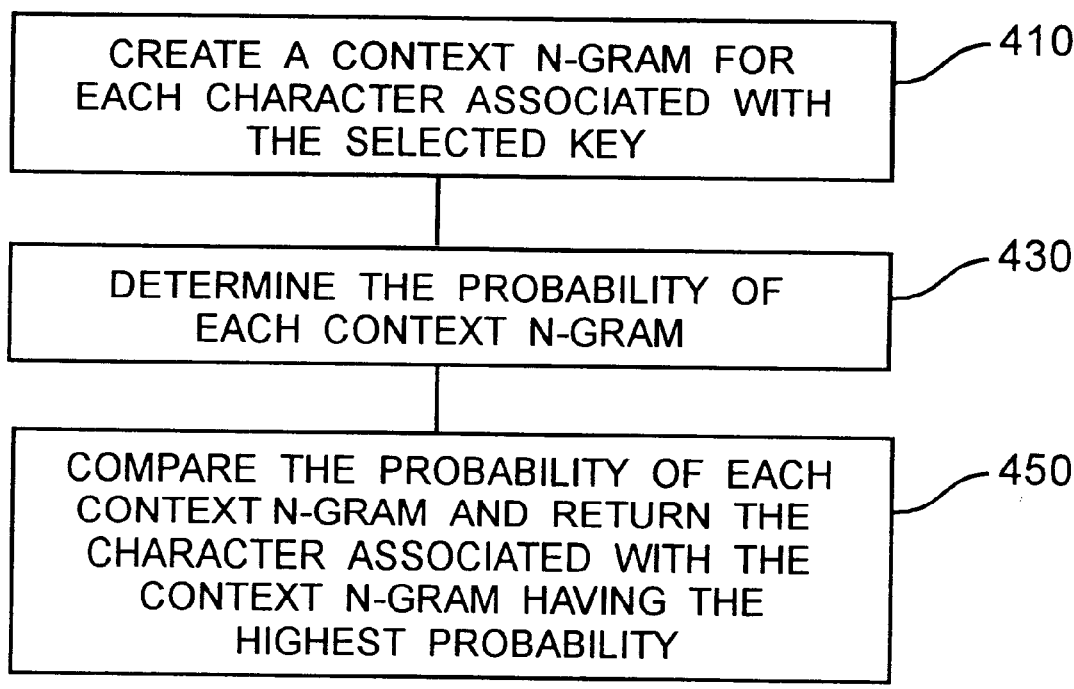
FIG. 4 is a flow chart of a method used to predict a character in a preferred embodiment.

FIG. 4 provides a more detailed block diagram for the prediction of step 330. First, a context n-gram is created in step 410 for each character associated with the key selected by the user. A context n-gram is a sequence of characters, where "n" represents the number of characters in the sequence (e.g., a 4-gram refers to a sequence of four characters). The last character in the sequence is one of the characters associated with the selected key. The first "n−1" number of characters in the sequence correspond to the last "n−1" number of previously-confirmed characters.

To illustrate these embodiments, the keypad 200 of FIG. 2 will be used as an example. In this example, the 26 letters of the English alphabet are associated with numbers 2–9, and the space is associated with the "0" key. Accordingly, there are 27 characters from which a user may choose. It should be remembered that this is merely one possible character-key association and that other associations may be used with more or fewer characters.

Consider, for example, a four-character context n-gram (i.e., a 4-gram) in which the user has already confirmed the letters "HELL" and now presses the "6" key. There are three possible characters ("M", "N", and "O") associated with this key, so three context n-grams would be created. Here, since a four character context n-gram is desired and the last character will be one of the possible characters, the last three previously-confirmed characters (i.e., "ELL") will be incorporated into the context n-gram. Accordingly, the three possible 4-character context n-grams are "ELLM", "ELLN", and "ELLO".

In the above example, the user entered a character for the middle of a word. When the user enters a character for the beginning of a word, several alternatives are possible in addition to the approach described above. One alternative is to fill the first n−1 positions in the context n-gram with the "space" character. Another alternative is to user a smaller-sized context n-gram.

After the context n-grams are formed, they are used to predict which character associated with the selected key is intended by the user. The number of times that each context n-gram was encountered in a sample text is determined in step 430. These probabilities are compared in step 450 and the character associated with the context n-gram having the highest probability is designated as the predicted character. That is, if a particular context n-gram was found more often than others in a sample text, it is likely that the particular context n-gram is meant to be entered by the user. Accordingly, the character associated with the context n-gram having the highest probability will be returned as the predicted character.

The frequency of the particular context n-grams occurring in a sample text can be measured by using a statistical model such as a probability table or a decision tree. Other ways of predicting the intended character can also be used such as by using a probability model not based on a sample text.

Probability Table

Figure 9:
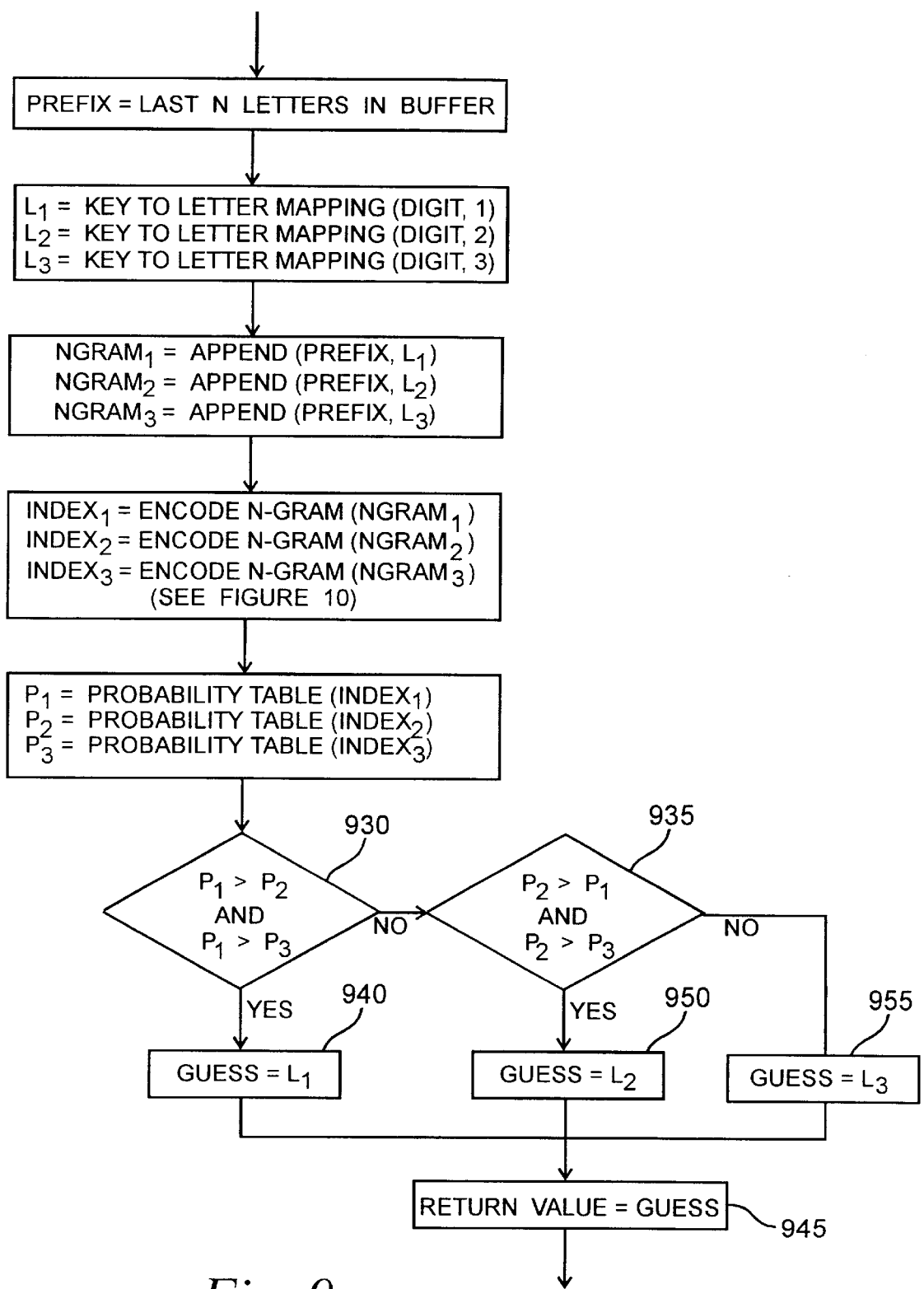
FIG. 9 is a flow chart of a method of a preferred embodiment in which probabilities of a plurality of context n-grams are compared.

In one embodiment, the context n-grams are used to index a probability table containing $N^{27}$ entries, assuming 27 possible characters, of the probabilities of each context n-gram in a sample text (see FIG. 9). The probabilities in this table are generated from the sample text, as described below.

As an alternative to storing all $N^{27}$ entries, only those context n-grams whose probability is greater than 0 can be stored. This requires storing the context n-gram itself along with its probability entry, and the context n-gram can serve as a search key. If the stored entries are sorted alphabetically by context n-gram, the entry can be found fairly efficiently via a binary search. Hash tables can also be used.

Because there may be added overhead of storing the context n-grams, this alternative approach may reduce storage requirements in instances where the number of valid (probability>0) context n-grams is small relative to the $N^{27}$ possible context n-grams (i.e., when N is large). If this is not the case, the added overhead may instead increase storage requirements.

This storing alternative has the advantage of reducing runtime computation and storage requirements. Storage costs can be further reduced by indicating the predicted character (one character of those associated with a key) by storing a two-bit binary number. Consider the case in which 4 letters of a 26-letter alphabet are associated with a key. Instead of storing the binary number indicating which of the 26 letters is predicted, it would only be necessary to store the binary number indicating which of the 4 candidate characters is predicted.

In another embodiment, the predictions are pre-compiled in the table instead of being determined when a key is selected. In this approach, rather than storing an $N^{27}$ sized table of probabilities for N sized context n-grams and computing the maximums and corresponding predictions at runtime, these computations are performed offline, and the resulting predictions are stored in an $8*(N-1)^{27}$ sized table. This table may contain one entry for each digit key 2–9 and 0 (those associated with characters in the keypad 200 of FIG. 2) and each possible set of prior characters.

To illustrate this, consider a context n-gram in which four characters are to be used to determine which character is intended by the user (i.e., a four-character context n-gram, or a 4-gram). The user has already entered the characters "HELL" and now presses the "6" key. There are three possible guesses ("M", "N", and "O") corresponding to three possible 4-grams ("ELLM", "ELLN", and "ELLO"). In the embodiment described above, the probability for each context n-gram is stored in a table, and the last letter of the context n-gram with the highest probability is selected. In the method of this embodiment, a context n-gram/key combination is used. A context n-gram/key combination is a context n-gram having its last position filled with a selected key instead of a character associated with the selected key. In the example above, the context n-gram/key combination is "ELL6". Only one entry is stored in the table. This entry corresponds to the predicted character. In the example above, the table entry for the "ELL6" context n-gram/key combination would simply contain the letter "O", which is the predicted character itself. This embodiment has the advantage of reducing runtime computation and storage requirements.

This embodiment may also use the storage alternative described above to store only valid (probability>0) context n-grams. A two-bit binary number may again be used to indicate which of the candidate characters is predicted. The key can also be represented by a reduced encoding in which each previously-confirmed character is represented by a 5-bit number and the key pressed is represented by a 3-bit number. That is, instead of representing each position in the context n-gram by a 5-bit number, only those positions with previously-confirmed characters are represented by a 5-bit number. The last position, that of the selected key, need only be represented by a 3-bit number. As described above, a 2-bit number indicates which of the 4 candidate characters is predicted. Using these reduced encodings, each entry for context n-grams of size N is represented by (N−1)*5+3+2 bits or a total of N*5 bits. This same concept applies when more or fewer characters are used.

Decision Trees

Figure 5:
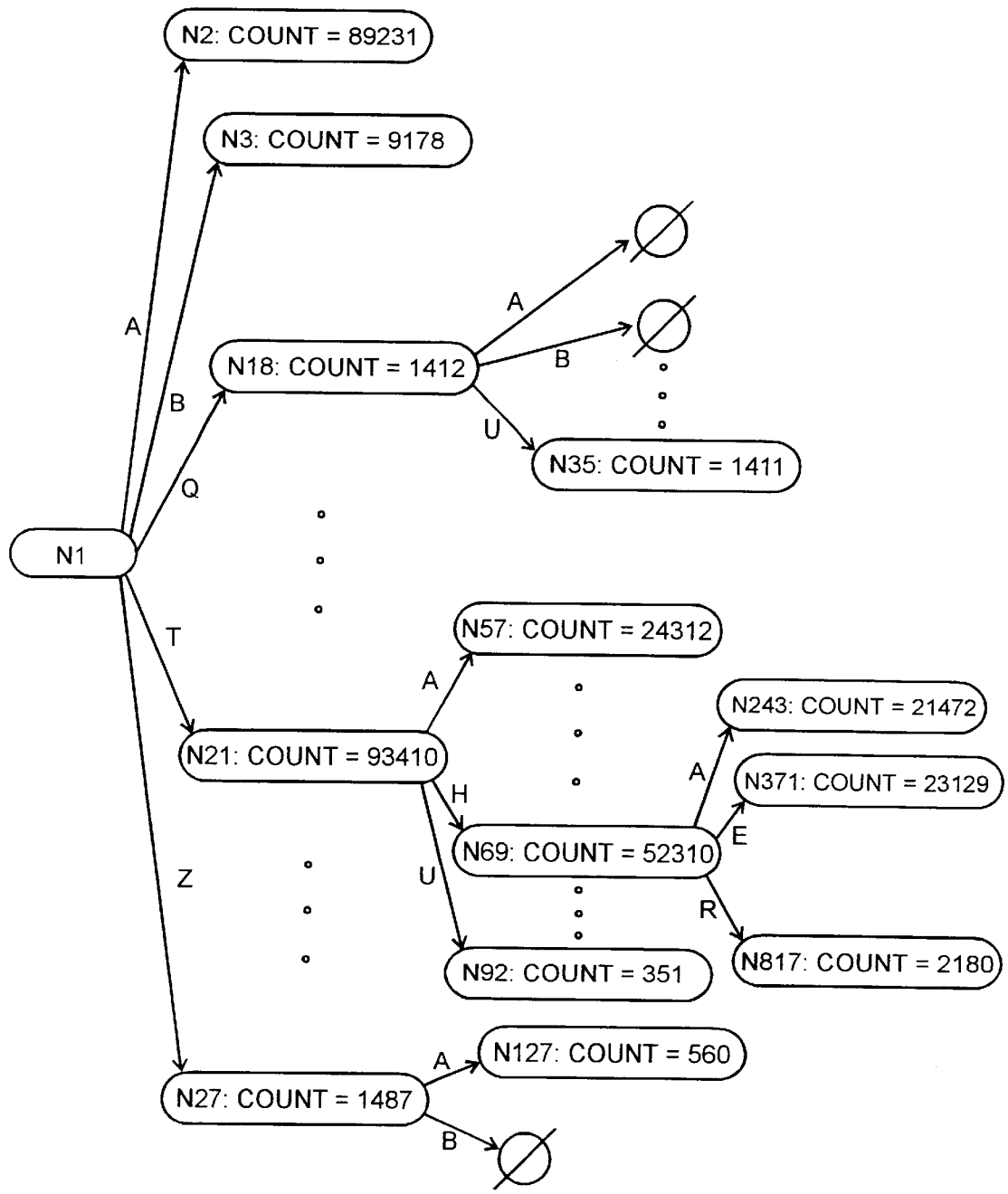
FIG. 5 is an illustration of a decision tree used in a preferred embodiment.

Another approach to storing context n-gram probabilities when the relative number of valid context n-grams (probability>0) is small is to use a decision tree. This is illustrated in FIG. 5 which shows a portion of such a tree. Context n-grams are processed one character at a time from left to right. At each node, starting at the root node N1, the link corresponding to the next character is followed to a subsequent node.

Figure 6:
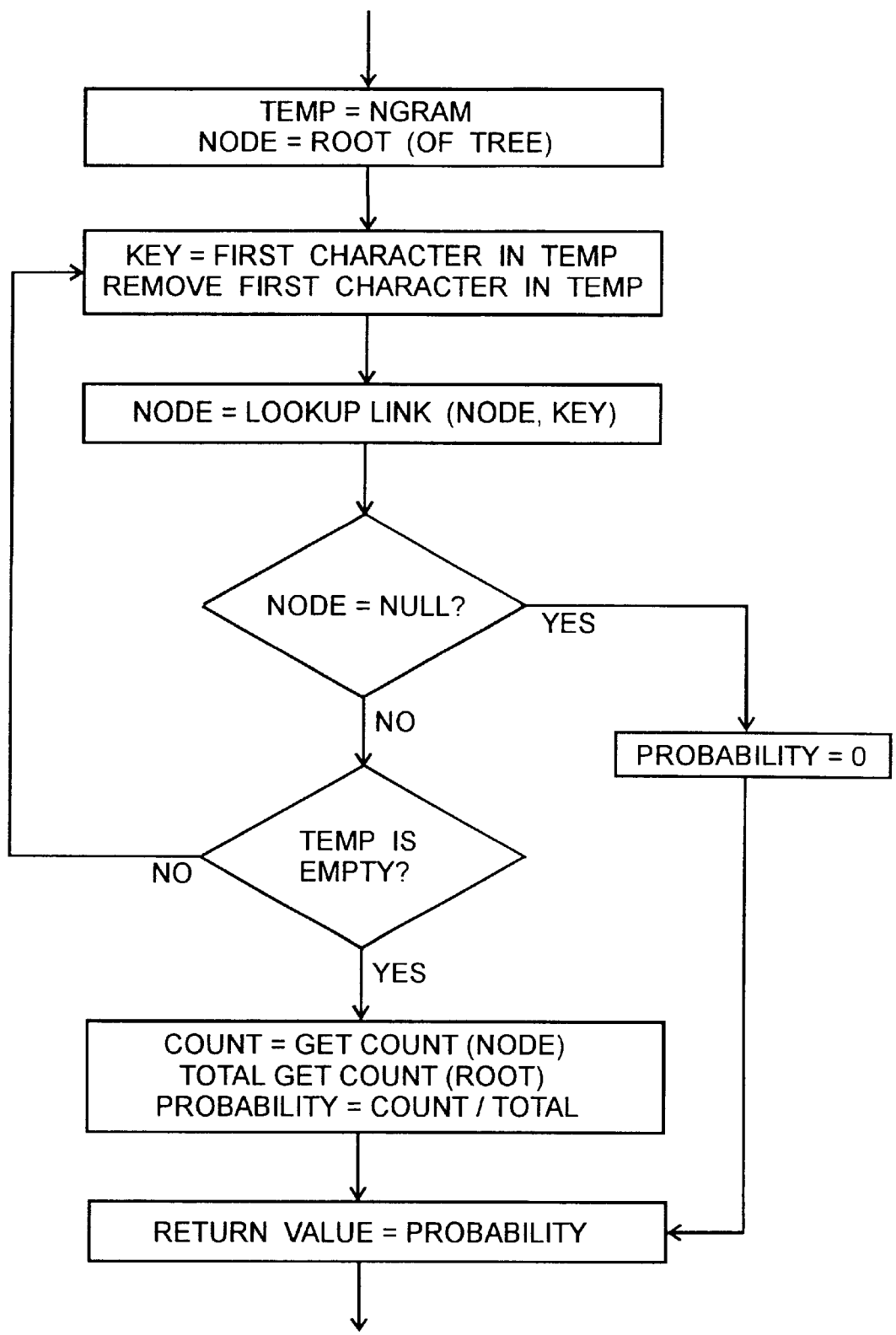
FIG. 6 is a flow chart of a method for calculating a probability of a context n-gram of a preferred embodiment.

For example, in FIG. 5 the context n-gram "THE" corresponds to the path node N1-node N21-node N69-node N371. The counts at each node refer to the number of times that the node was traversed when the tree was initialized, as described in more detail below. In FIG. 5, the count for "THE" is 23129. Similarly the count for "TH" is 52310, and the count for "T" is 93410. The probability of a particular context n-gram may be computed by dividing the count of a node by the count stored at the root of the tree. FIG. 6 illustrates one simple algorithm that may be used to calculate the probability for a particular context n-gram.

Figure 7:
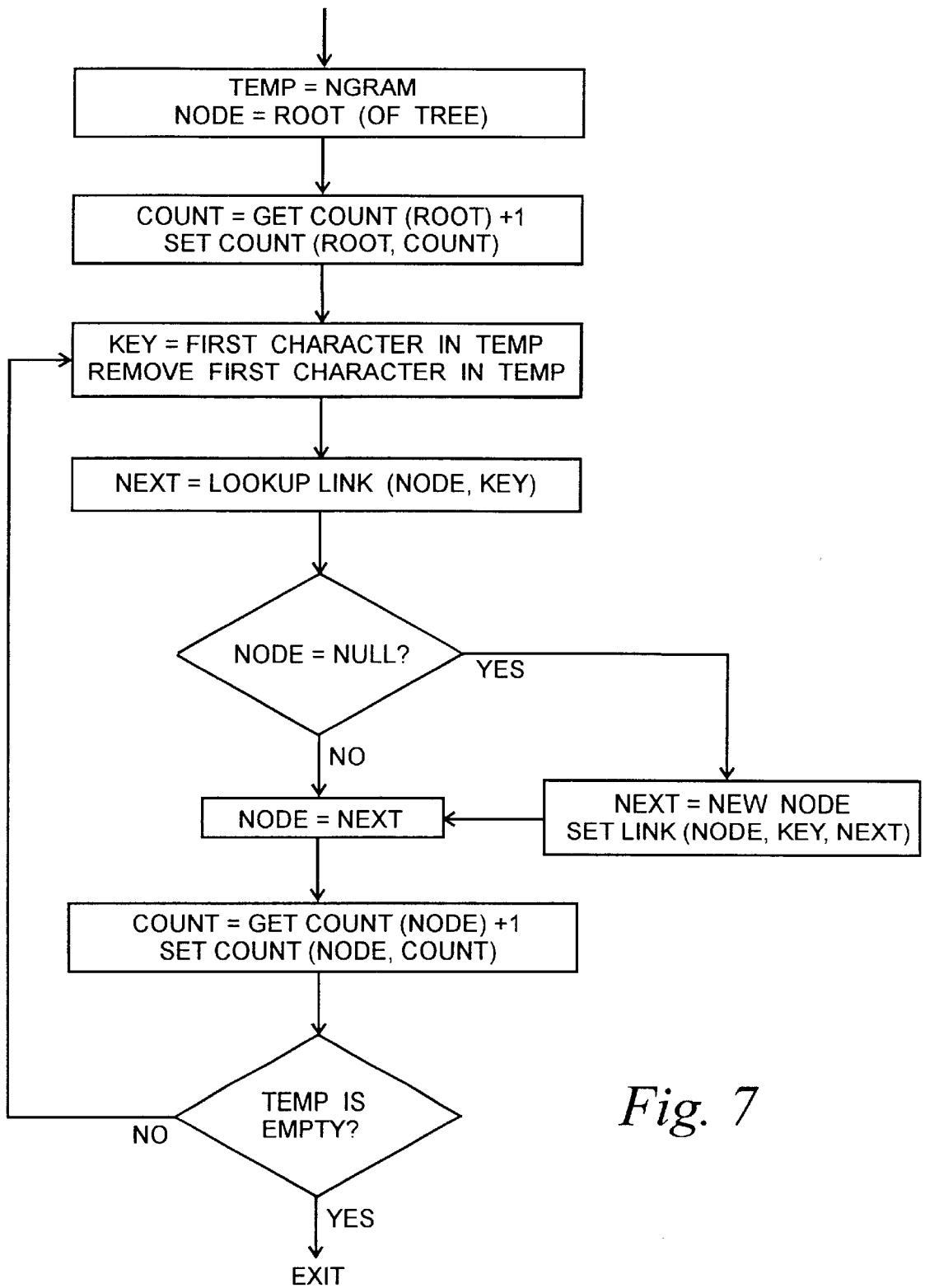
FIG. 7 is a flow chart of how a decision tree of a preferred embodiment is constructed.

The tree is constructed by adding context n-grams one at a time to a tree which initially consists of only the root node. FIG. 7 shows one simple algorithm that may be used to add context n-grams to trees. As each context n-gram is added, counts are incremented at each node encountered, and new nodes are created when there is no existing path. The count of each new node is initialize to 1.

Note that no paths exist for context n-grams which have probability of 0. For example, in FIG. 5, the path leading from node N27 for the letter "B" is null. This is because there are no context n-grams beginning with "ZB". This property makes this representation efficient when the number of valid context n-grams is small relative to the $N^{27}$ possible context n-grams. When this is not the case, the overhead associated with storing nodes and links can make this representation less efficient.

Figure 8:
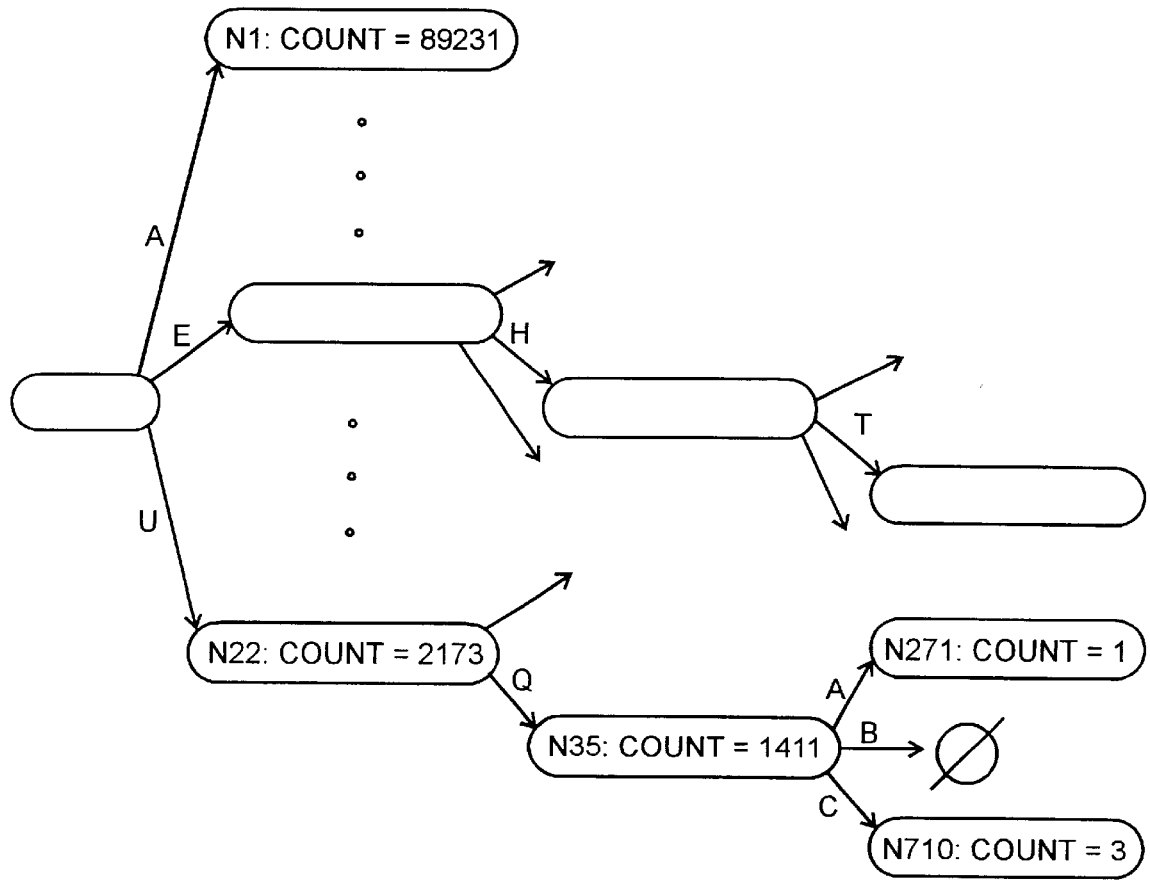
FIG. 8 is an illustration of a decision tree of a preferred embodiment in which a context n-gram is stored in reverse order.

By storing the context n-grams in reverse order (as shown in FIG. 8), the decision-tree embodiment can lead to better prediction. Since a finite sample size is required to estimate context n-gram probabilities, it is possible that valid context n-grams encountered when the system is being used were not encountered in the training text. This results in non-zero probabilities being stored as zero probabilities in the context n-gram table. Furthermore, when non-zero counts are very small, statistical reliability is sacrificed. When such suspect values are used for comparison, prediction becomes arbitrary. This overfitting problem becomes more severe as context n-gram size is increased.

When counts on entire context n-grams are unreliable, smaller sized context n-grams may be used for prediction when the above-described reverse-order tree representation is used. This is accomplished by traversing the tree until counts fall below some threshold or fail to satisfy some statistical-significance test. For example, when processing the context n-gram "AQU" in FIG. 8, traversal would stop at node N35 since nodes beyond this point contain counts too small to be reliable. In this case, the probability for the context n-gram "QU" would be used to perform prediction, rather than the entire context n-gram "AQU" which could lead to poorer performance.

After the probability of each context n-gram is determined (using either the table or the tree approach), the probabilities are compared, and the character associated with the context n-gram with the highest probability is returned to the user.

FIG. 9 illustrates how this may be done for the case where three characters are associated with the selected key and where a probability table is indexed with a context n-gram. It is important to note that this is only an example and that other ways of generating context n-gram probabilities can be used. If the probability of the first context n-gram is greater than the probability of each of the two other context n-grams (block 930), the character associated with the first context n-gram (block 940) is returned to the user (block 945). If the probability of the second context n-gram is greater than the probability of the other two context n-grams (block 935), the character associated with the second context n-gram (block 950) is returned to the user (block 945). Otherwise, the character associated with the third context n-gram (block 955) is returned to the user (block 945).

Presenting the Predicted Character (Steps 350 and 390)

Once the application predicts a character, the character is presented to the user. This typically is done via a voice prompt, but other ways of presenting the predicted character to the user may be used. For example, the predicted character can appear on the screen of a screen phone with or without speech prompts.

Confirming the Selection (Steps 370 and 390)

Once the predicted character is presented to the user, the user either confirms or rejects the presented character. Two alternate embodiments are as follows:

Using a Cycle Key to Reject the Character

Figure 11:
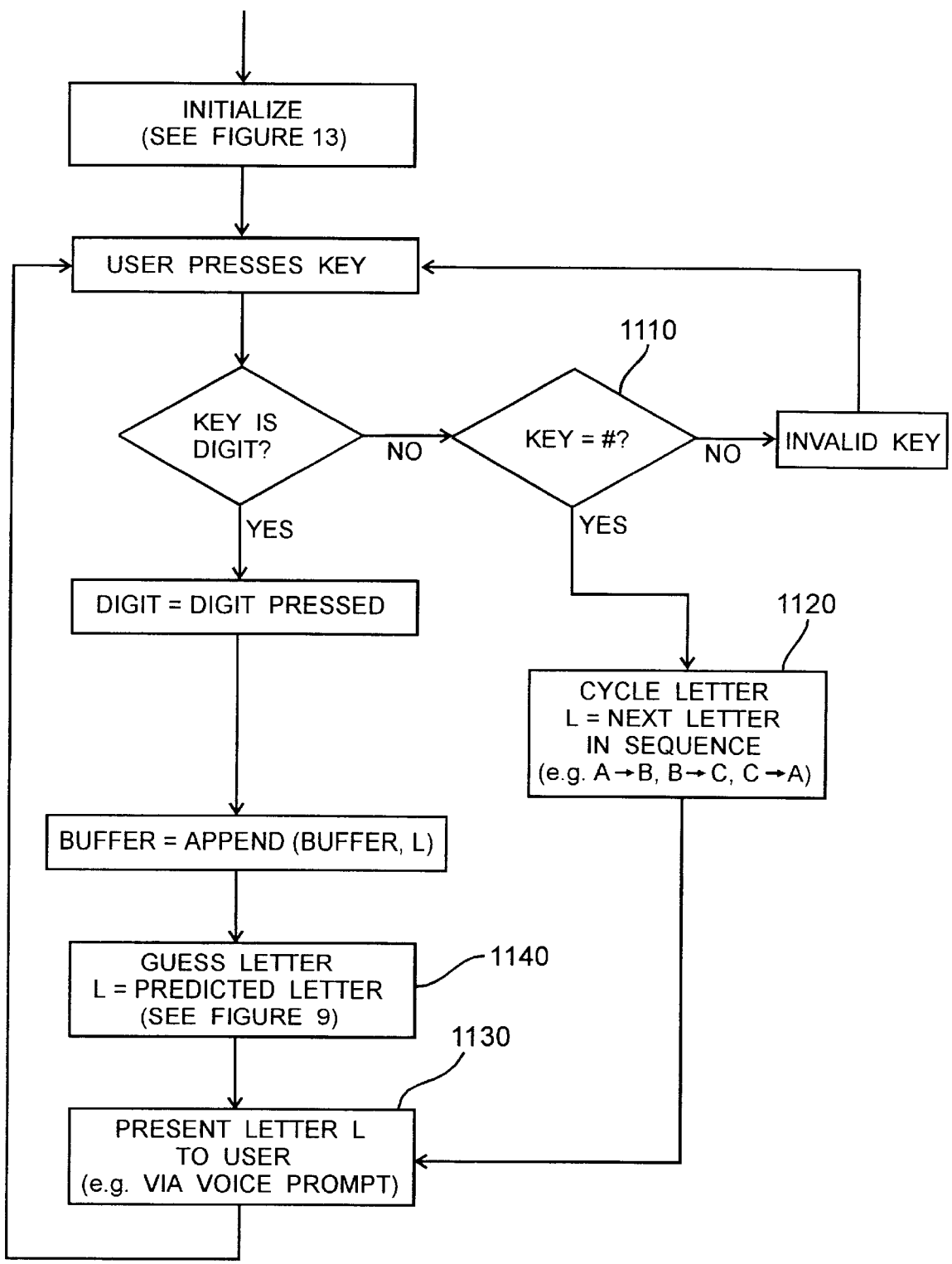
FIG. 11 is a flow chart of a method of a preferred embodiment in which a predicted character is rejected by using a cycle key.

In one embodiment, if the predicted character is not what the user intends, the user can reject the character by selecting a cycle key. As used herein, a "cycle key" is a key designated on the keypad as the key that rejects the presented character and allows the presentation of a new character. The cycle key can be any key (e.g., the "#" key in block 1110 of FIG. 11) and typically does not correspond to any set of characters. FIG. 11 illustrates an example of this embodiment.

Once the cycle key is selected, a new character is chosen in block 1120 and presented in block 1130 to the user for confirmation. The new character is chosen from the set of characters corresponding to the originally selected key but is different from the one previously presented to the user. The new character may be chosen in any way. For example, the new character may be the next most probable character, or it may simply be the next sequential character in the set (e.g., A→B→C for the "2" key in the keypad 200 of FIG. 2).

The new character can be rejected by selecting the cycle key again, and another new character is then chosen and presented to the user. This choosing-and-presenting a new character continues until the user confirms the character.

The user confirms a character in this embodiment by selecting any key which has a set of characters associated with it (e.g., not the cycle key). When such a key is selected, a character from the set of characters associated with the newly-selected key is predicted at block 1140 and presented in block 1130 to the user for confirmation as before.

This embodiment has the advantage of using effectively only one keystroke to enter and confirm a character, if the predicted character is intended by the user. In this way, the user can type characters on the keypad as he would on a typewriter (i.e., selecting one key per character).

Selecting the Same Key Again to Reject the Character

Figure 12:
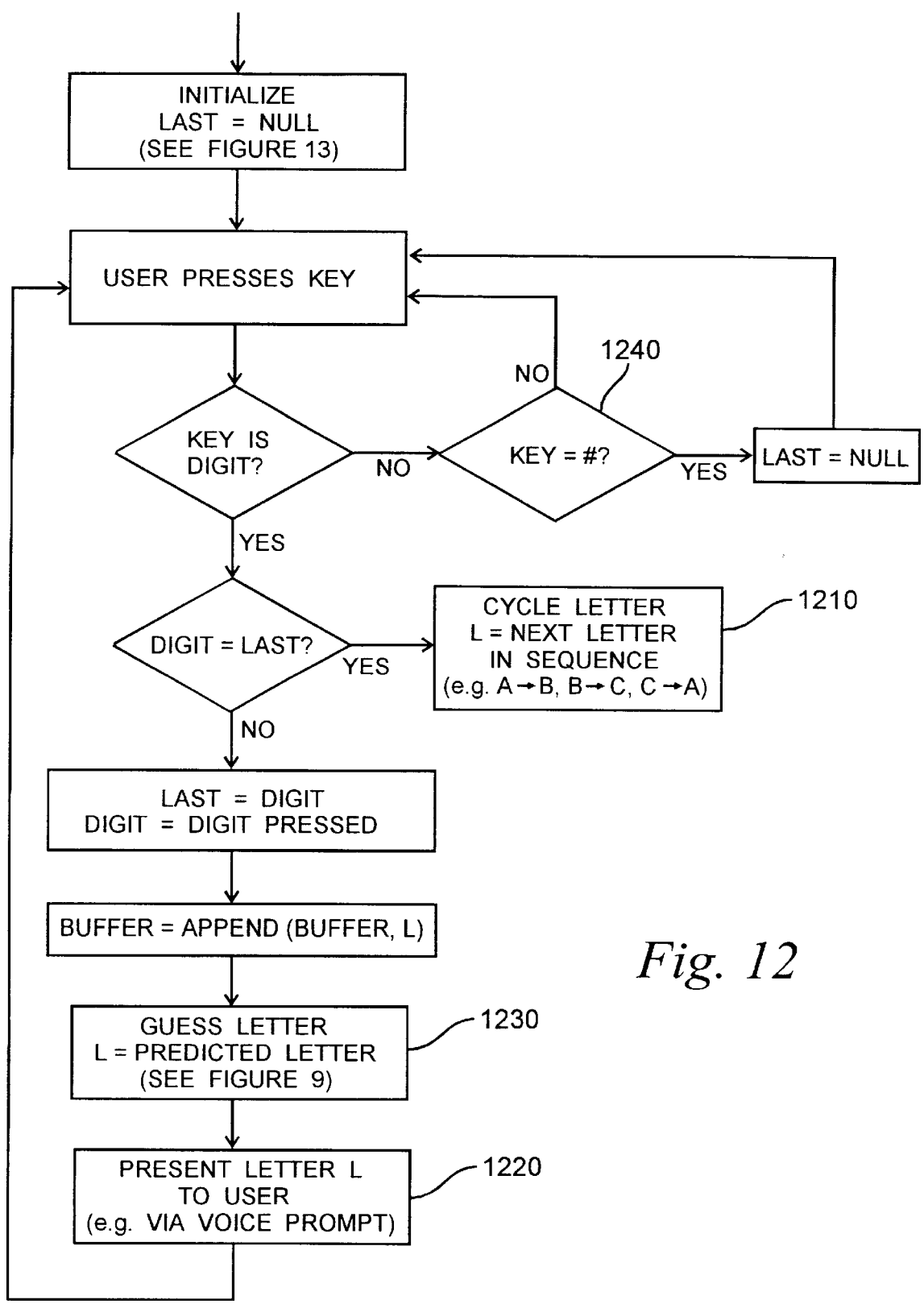
FIG. 12 is a flow chart of method of another preferred embodiment in which a predicted character is rejected by re-selecting a key.

In another embodiment (see FIG. 12), if the character presented to the user is not the intended character, the user can reject the character by selecting the same key again. For example, if the "2" key were selected initially and the user wishes to reject the presented character, the user would select the "2" key again. When the user selects the same key again, a new character is chosen at block 1210 and presented at block 1220 to the user for confirmation.

The new character is chosen from the set of characters corresponding to the selected key but is different from the one previously presented to the user. The new character may be chosen in any way. For example, the new character may be the next most probable character, or it may simply be the next sequential character in the set (e.g., A→B→C for the "2" key in the keypad 200 of FIG. 2).

This new character can be rejected by selecting the same key again, and another new character is then chosen and-presented to the user. This choosing-and-presenting a new character continues until the user confirms the character.

The user confirms a character in this embodiment by selecting any different key that has a set of characters associated with it. For example, if the "5" key were originally selected and a predicted character were presented to the user, the character would be confirmed if the user selected another key, such as the "2" key. When a different key is selected, a character from a set of characters associated with the different key is predicted at block 1230 and presented at block 1220 to the user for confirmation as before.

In this embodiment, the user needs to select an additional key if he wants to confirm the presented character and select a new character which corresponds to the key of the just-confirmed character. This would happen, for example, when the user wishes to confirm the character "N" associated with the "6" key on the keypad 200 of FIG. 2 and wishes the next character to be the character "O," a character also associated with the "6" key. If the user selects the "6" key after the character "N" is presented, the character "N" would be rejected.

To avoid this unintended result, the user selects a confirm-character key. As used herein, a "confirm-character key" is a key designated on the numeric keypad as the key that will, when pressed before a key is selected twice in a row, prevent the application from rejecting the presented character. The confirm-character key can be any key (e.g., the "#" key 1240) and typically does not correspond to any set of characters.

This embodiment may be more convenient to the user since it allows him to reject a presented character without moving his finger from the selected key to a cycle key.

The two alternative embodiments described above are merely examples. Other methods of confirming or rejecting the selection include depressing a key a plurality of times, depressing the flash hook, using a pressure-sensitive key, and measuring the length of time the selected key is depressed.

Storing the Confirmed Character (Steps 370 and 395)

When a character is confirmed by the user, it is stored (in a buffer for example) for use in the next context n-gram that is created. That is, the confirmed character would be the second to the last character in the next context n-gram (the last character in the next context n-gram being one of the characters associated with the newly-selected key). The character may also be sent to an application to which the user is entering characters.

Alternatives

Characters

As used here, the term "character" includes, but is not limited to, a letter, a number, a blank space, or a symbol, such as a comma or a period. While the keypad 200 of FIG. 2 illustrates one example of character-key associations, others may be used. Also, while characters printed on the key itself may indicate which characters are associated with a particular key, this is not always the case. For example, on some telephone keypads, the characters "Q" and "Z" are not represented on the face of the key. The embodiments described above may still be used to predict these characters even though they are not displayed on the key itself.

Numbers can be handled in the embodiments above by including numbers in the set of characters to be cycled through. For example, if the user desires to enter a "4", he would press the "4" key. If the previous character entered were a letter, the system would present one of the letters associated with the "4" key ("G", "H", or "I" in the keypad 200 of FIG. 2) as before, and the user would be able to cycle through the set of characters including the character "4". The character "4" may, for example, be presented after all of the letters are cycled through. For example, if the initial guess is "H", the sequence of characters presented to the user (upon cycling) can be: "H"-"I"-, "G"- "4". If the previous character entered is a number, however, the initial prediction would also be a number, and cycling would present letters. In this case the sequence can be, for example: "4"- "G"- "H"- "I".

Punctuation can be handled by associating punctuation symbols with a key that is not already associated with letters, for example. As an illustration, the "1"key can be associated with the characters ".", ",", "?", ";". The symbols chosen will often depend on the application. These symbols are cycled through in the same manner described above for other characters.

User Interface

On a standard telephone, feedback can be provided to the user via a voice prompt. On a screen phone, feedback can be provided by echoing characters on the screen and can also include a speech prompt. With a standard telephone, a designated key (e.g., the "*" key) can enter the user into an Interactive Voice Response system (IVR), which handles editing, replay, and application dependent functions including exiting the text editing function and returning to the application and controlling the disposition of text actually entered (e.g., passing it on to an application). On a screen phone, these functions can be handled by various keys (including menu soft keys) on the telephone.

Figure 1:
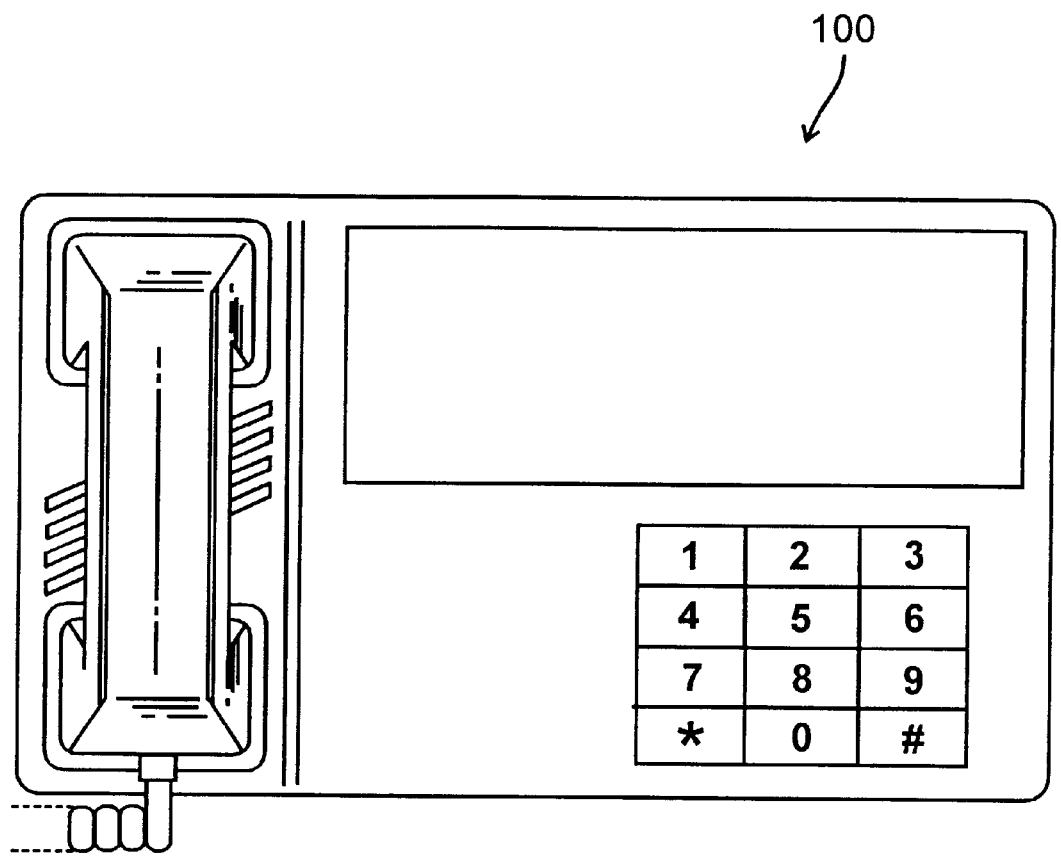
FIG. 1 is an illustration of a prior art telephone that may be used with a preferred embodiment of the present invention.

While the standard telephone 100 of FIG. 1 can be used, other applications can be used with the embodiments described above. For example, an interactive television application can be used in which a remote control is used to select a key and where the predicted character is echoed on the television screen. In another example, a key is selected by navigating a cursor on the television screen.

Several alternatives can be incorporated into the embodiments described above to improve the accuracy of the predictions.

Part-of-Speech Probabilities

Prediction performance is poorer at the beginning of a word when there are no previously-confirmed characters available. Predictions can be made more reliable by using part-of-speech evidence. Using part-of-speech evidence comprises conditioning the probability of a character appearing in the i-th position of a word on the part of speech (e.g., verb, noun, etc.) of that word. The part of speech of the word can be estimated by examining the previous words in the sentence. A simple approach is to apply standard part-of-speech tagging methods that use a priori probabilities of parts of speech for individual words and probabilities of sequences of parts of speech (e.g., probability of the sequence DETERMINER-NOUN-VERB) to identify the most probable part of speech of each word in a sequence. More elaborate linguistic analysis such as parsing can also be employed.

With this in hand, the probability of a particular letter being the i-th letter of a word with a particular part-of-speech can be used to make a more reliable prediction of the letter. This is particularly powerful for predicting the first letter of closed-classed words (a small, finite class of words known ahead of time) such as determiners ("A", "THE", "AN", etc.) and prepositions ("ON", "IN", "OF", etc.).

Equivalence Classes of Characters

Predictive performance can be improved in some cases by incorporating equivalence classes of characters into context n-grams. An equivalence class of characters is a set of characters that can be used interchangeably in a particular context. A single symbol denoting the class can substitute for any occurrence of a character within that class, for example, when compiling context n-gram probabilities. For example, "vowel" can be the class containing the letters "A", "E", "I", "O", and "U". Accordingly, a single context n-gram such as "vowel-S-T-R-vowel" can be used in place of several context n-grams of the form "A-S-T-R-A", "A-S-T-R-E", ..., "E-S-T-R-A", ... By estimating probabilities of context n-grams containing these equivalence classes, longer context n-grams can be used without sacrificing statistical significance.

Well-known classes such as "vowel" and "consonant" classes, classes derived from speech processing knowledge (e.g., voiced consonant), or classes formed automatically via processes such as clustering can be used. In the latter case, letters that appear frequently in the same context (i.e., same preceding and subsequent context n-grams) can be clustered in the sample text.

More Powerful Models

More powerful models, particularly grammatical models such as Hidden Markov Models, can increase performance. Neural networks have properties which can also be helpful in improving performance. In particular, a neural network's ability to partition a high-dimensional space into meaningful classes can lead to implicit discovery of the equivalence classes and grammatical structure described above. This, in turn, can allow use of larger context n-grams, leading to improved prediction performance.

A simple encoding of input vectors as N*26 bit Boolean vectors and output vectors as 26-bit Boolean vectors can be adopted, but other encoding schemes can also be used. In this scheme, each letter in a context n-gram is a 26-bit vector set to zeroes except in the position of the letter (e.g., for "C" bit[3]=1 and the remaining bits=0). The input vector is a concatenation of the vectors for the individual letters in the context n-gram. The output vector is simply the vector corresponding to the predicted letter.

Using Word Derivations

The English language, for example, is itself a conglomeration of many different languages and influences. Many words originally derive from Latin, Greek, and French, among other languages. Each such language has its own unique statistical properties. If the language of a particular word is known, the appropriate context n-gram statistics can be used to attain better predictive performance. The language can in turn be predicted probabilistically from the letter combinations in words.

When the language of a word is unknown a priori, prediction performance can be improved by using context n-grams in the early part of a word to predict language which, in turn, can be used to improve prediction of letters later in the word. For example, an observed context n-gram of "CZ" is a clue that the word is of eastern European origin which, in turn, alters the probabilities of subsequent context n-grams (e.g., "YK"). This approach is, of course, particularly useful in improving performance on proper names.

In general, these long range dependencies among words can lead to improved performance if grammatical structure of words is taken into account via grammatical inference methods such as Hidden Markov Models. Longer context n-grams can achieve the same effect with sufficient sample size. Given the constraints on sample size actually available, however, the uses of equivalence classes and grammatical inference methods can exploit the structure in language to take advantage of this additional evidence without sacrificing statistical reliability.

Other Alternatives

Figure 10:
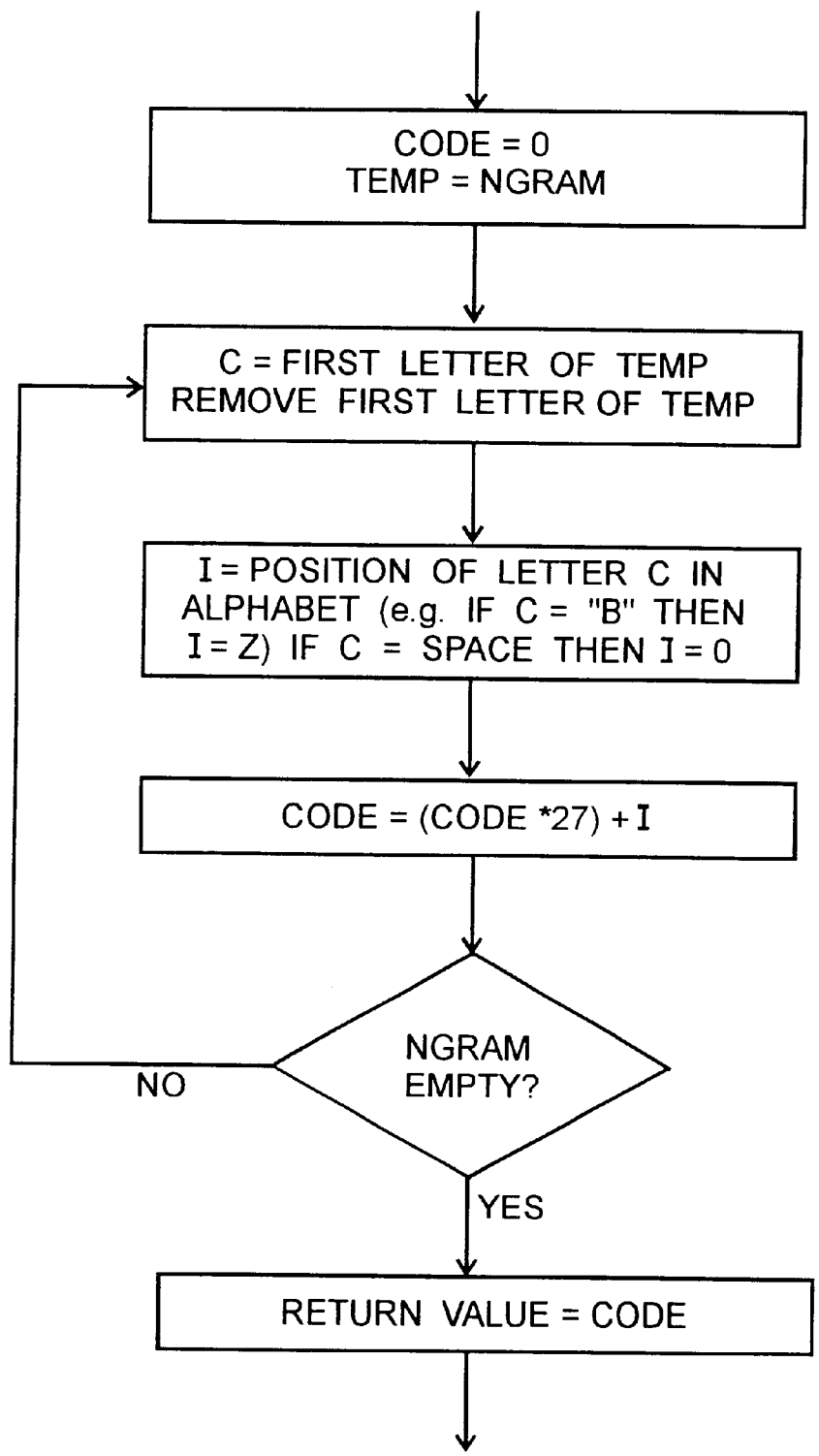
FIG. 10 is a flow chart of an encoding method of a preferred embodiment.
Figure 13:
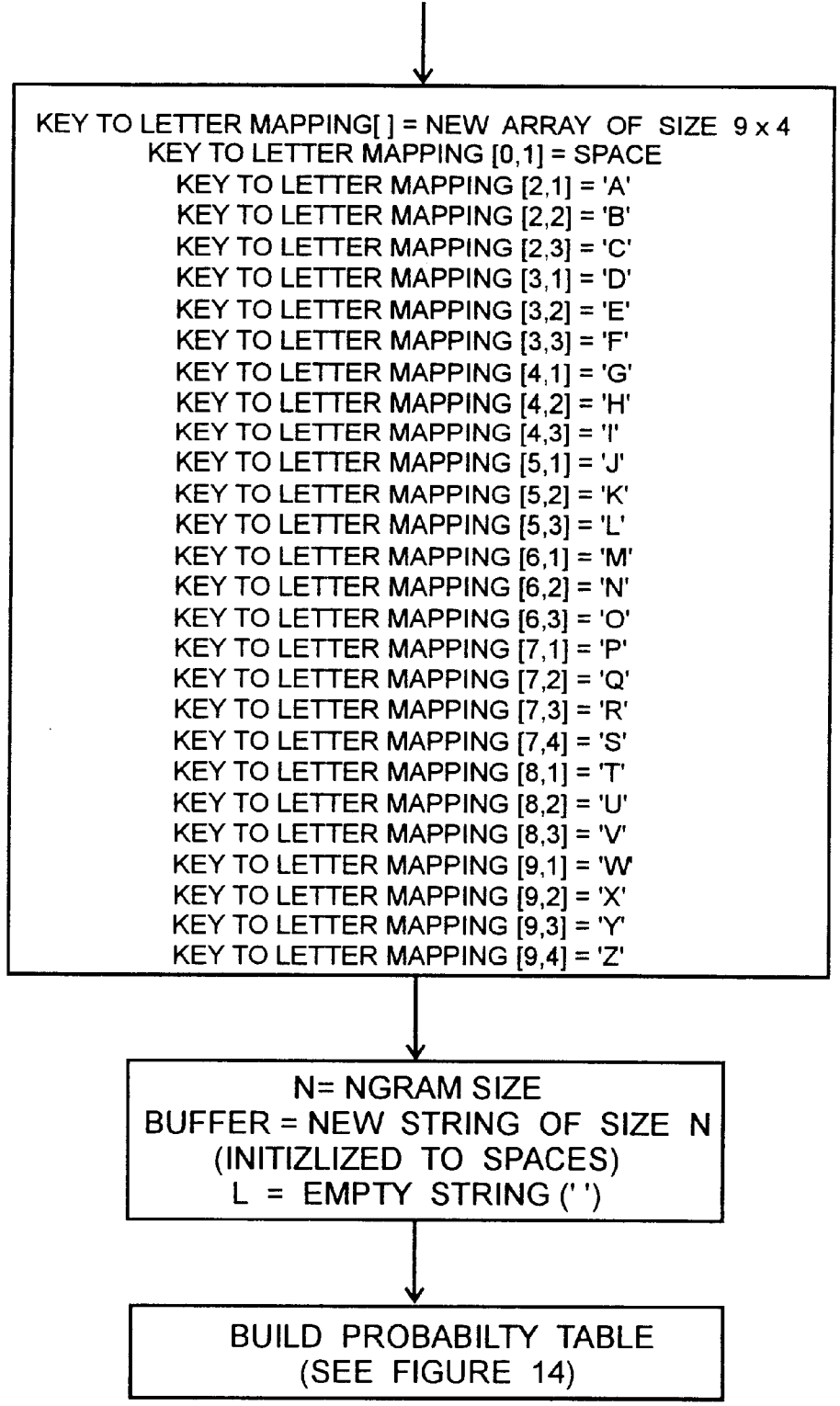
FIG. 13 is a flow chart of an initialization method of a preferred embodiment.
Figure 14:
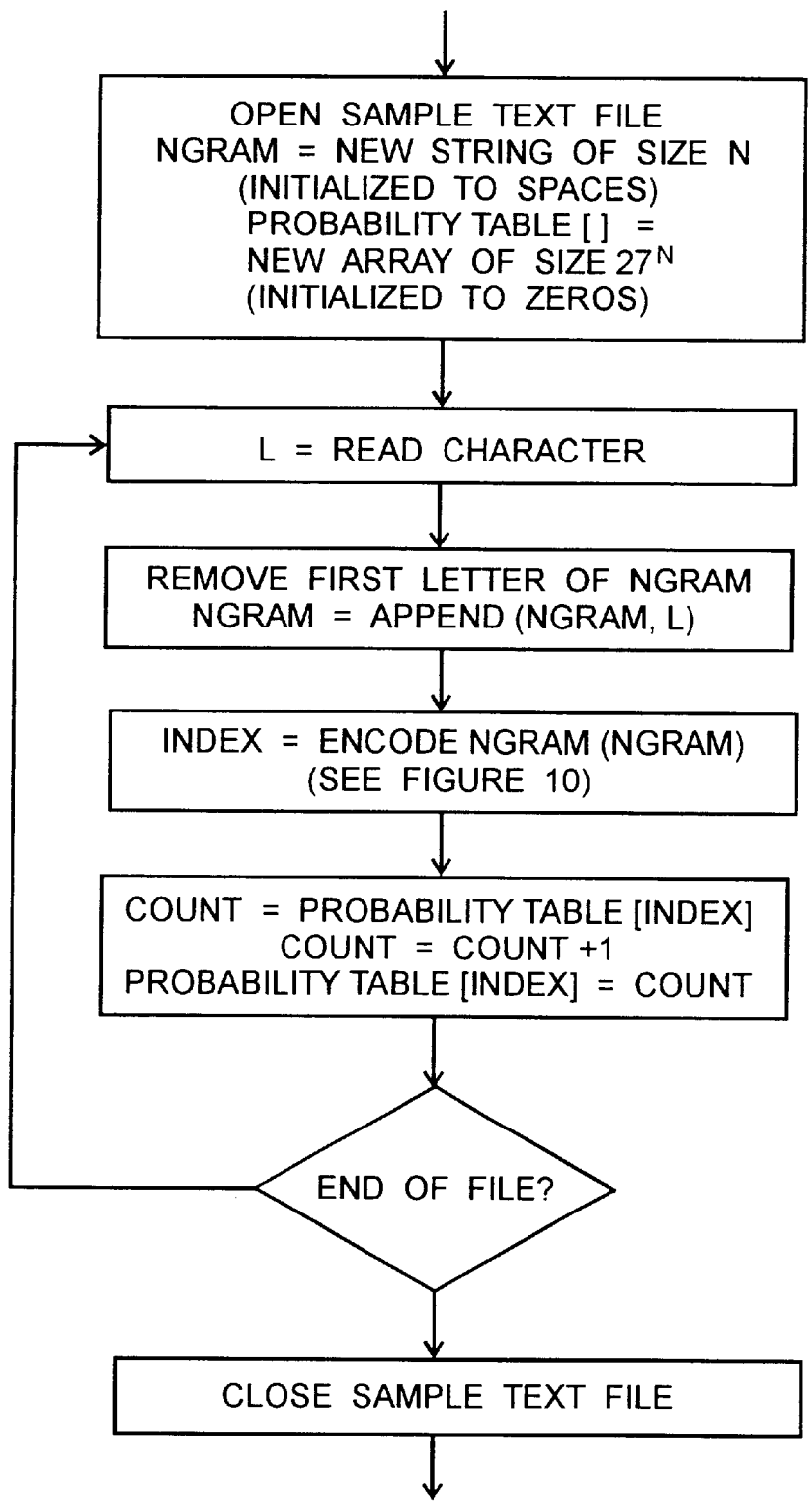
FIG. 14 is a flow chart of a method of a preferred embodiment for generating a plurality of probabilities in a table.

Probabilities for the tree and table embodiments described above can be generated from a sample text. FIGS. 10, 13, and 14 show an example of a flow chart illustrating a simple algorithm which can be used to generate probabilities from a sample text.

In the embodiments described above, different languages can be supported by merely substituting probability tables or trees derived from sample text of that language.

In a similar manner, the system can be tuned to particular applications by using statistics derived from a sample text unique to the application. For example, if the system is used to enter proper names, it can be trained using a text source of names such as a machine-readable telephone directory.

Additionally, the system can be tuned to particular users or applications by updating statistics in real time as users use the system. In this case, as users type characters using the system, probabilities are updated, if the tree or table is available for updating.

Figure 15:
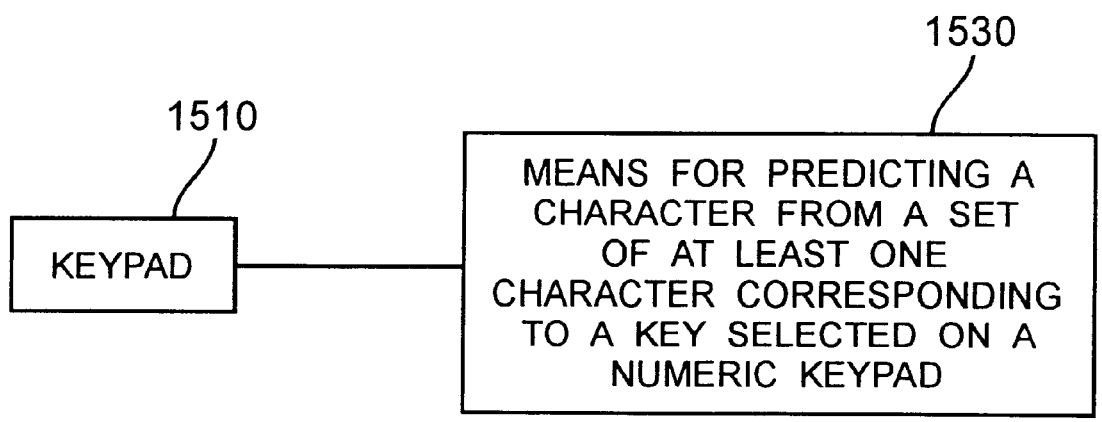
FIG. 15 is an illustration of two components in a system of a preferred embodiment.

The method of the embodiments described above can be used in a system having a numeric keypad (block 1510) and means for predicting a character from a set of at least one character corresponding to a key selected on a numeric keypad (block 1530), as seen in FIG. 15. These two components can be in the same device or in different devices. The means for predicting a character can be a computer comprising computer readable program code means embodied therein to perform any of the above described methods (e.g., predicting a character, generating a context n-gram, predicting a character based on the context n-gram, storing a character, and using a context n-gram/key combination to determine the intended letter). The embodiments described above may be programmed using, e.g., Visual Basic, Conversant, or Java.

It is important to note that the preferred embodiments and the alternatives described above may be combined. It is also important to note that the algorithms and examples set out in the flow-charts are merely examples and that other ways of implementing the functions described are possible.

The pre-compiled probability table embodiment described above may be considered the most desirable, if the real-time updating alternative is not being used. If memory availability is an issue (e.g., in small devices such as telephones), the alternative storage mechanism described above can be used (i.e., by using a binary search and by encoding context n-grams and predicted letters as minimal sized binary numbers).

In applications in which digits are not needed, the complexity of the system can be reduced by not supporting these characters.

A simple context n-gram model has empirically performed well when one of the more powerful models described above (e.g., Hidden Markov Models or neural networks) was not used and when a small sample size was used. In such a case, using a context n-gram of size 4 provided the best trade-off between sufficient context and overfitting.

Using a sample text such as a machine-readable English novel (e.g., *Moby Dick*) can lead to sizable predictive accuracy. Of course, a larger sample size can provide better performance. For most general applications (e.g., messaging), better results are likely if the training text is supplemented with a source of proper names such as a machine-readable telephone directory.

It is intended that the foregoing detailed description be understood as an illustration of selected forms that the invention can take and not as a definition of the invention. It is only the following claims, including all equivalents, which are intended to define the scope of this invention.

What is claimed is:

1. A method for character prediction and entry using a telephone keypad comprising a plurality of keys, at least one of the plurality of keys being associated with a plurality of characters, the method comprising:

(a) detecting a selection of a first key on a telephone keypad of a telephone, the first key being associated with a first plurality of characters;

(b) creating an n-gram for each of the first plurality of characters associated with the first key selected in (a);

(c) determining a respective probability of each of the n-grams created in (b);

(d) comparing the probabilities of each of the n-grams;

(e) selecting the n-gram associated with the highest probability;

(f) presenting the character associated with the n-gram selected in (e) to a user via a voice prompt and not via a visual display, wherein the characters not associated with the n-gram of the highest probability are not presented to the user;

(g) in response to a detection of a selection of a cycle key, presenting another character associated with the first key selected in (a) to the user via a voice prompt and not via a visual display; and (h) in response to a detection of a selection of a second key associated with a second plurality of characters, presenting a character from the second plurality of characters to the user via a voice prompt and not via a visual display, wherein the first key is the same as or different from the second key and wherein the second plurality of characters is the same as or different from the first plurality of characters;

wherein the respective probability of each of the n-grams created in (b) is based on a part-of-speech of a word being entered and wherein the part-of-speech of the word being entered is based on a part-of-speech of a previously-entered word.

2. The method of claim 1, wherein (c) comprises determining a respective probability of each of the n-grams created in (b) by indexing a probability table with each of the n-grams created in (b).

3. The method of claim 1, wherein (c) comprises determining a respective probability of each of the n-grams created in (b) by indexing a decision tree with each of the n-grams created in (b).

4. The method of claim 1, wherein the cycle key comprises a "#" key.

5. The method of claim 1, wherein (g) is repeated until the user selects another key on the keypad.

6. A method for character prediction and entry using a telephone keypad comprising a plurality of keys, at least one of the plurality of keys being associated with a plurality of characters, the method comprising:

(a) detecting a selection of a key on a telephone keypad of a telephone, the key being associated with a plurality of characters;

(b) creating an n-gram for each of the plurality of characters associated with the key selected in (a);

(c) determining a respective probability of each of the n-grams created in (b) by indexing a probability table with each of the n-grams created in (b);

(d) comparing the probabilities of each of the n-grams;

(e) selecting the n-gram associated with the highest probability;

(f) presenting the character associated with the n-gram selected in (e) to a user via a voice prompt, wherein the characters not associated with the n-gram of the highest probability are not presented to the user;

(g) presenting another character associated with the key selected in (a) to the user via a voice prompt in response to the user selecting a cycle key; and (h) in response to a detection of a selection of second key associated with a second plurality of characters, presenting a character from the second plurality of characters associated with the second key to the user via a voice prompt, wherein the second key is the same as or different from the key selected in (a) and wherein the second plurality of characters is the same as or different from the plurality of characters associated with the key selected in (a);

wherein the respective probability of each of the n-grams created in (b) is based on a part-of-speech of a word being entered and wherein the part-of-speech of the word being entered is based on a part-of-speech of a previously-entered word.

7. The method of claim 6, wherein (g) is repeated until the user selects another key on the keypad.

8. The method of claim 6, wherein the cycle key comprises a "#" key.

9. The method of claim 6, wherein the probability table comprises only entries of n-grams that have a non-zero probability.

10. The method of claim 6, wherein the probability table comprises a plurality of n-gram/key combinations.

11. The method of claim 6, wherein the characters presented in (f) and (g) are presented via a voice prompt and not via a visual display.

12. A method for character prediction and entry using a telephone keypad comprising a plurality of keys, at least one of the plurality of keys being associated with a plurality of characters, the method comprising:

(a) detecting a selection of a key on a telephone keypad of a telephone, the key being associated with a plurality of characters;

(b) creating an n-gram for each of the plurality of characters associated with the key selected in (a);

(c) determining a respective probability of each of the n-grams created in (b) by indexing a decision tree with each of the n-grams created in (b);

(d) comparing the probabilities of each of the n-grams;

(e) selecting the n-gram associated with the highest probability;

(f) presenting the character associated with the n-gram selected in (e) to a user via a voice prompt, wherein the characters not associated with the n-gram of the highest probability are not presented to the user;

(g) presenting another character associated with the key selected in (a) to the user via a voice prompt in response to the user selecting a cycle key; and (h) in response to a detection of a selection of second key associated with a second plurality of characters, presenting a character from the second plurality of characters associated with the second key to the user via a voice prompt, wherein the second key is the same as or different from the key selected in (a) and wherein the second plurality of characters is the same as or different from the plurality of characters associated with the key selected in (a);

wherein the respective probability of each of the n-grams created in (b) is based on a part-of-speech of a word being entered and wherein the part-of-speech of the word being entered is based on a part-of-speech of a previously-entered word.

13. The method of claim 12, wherein (g) is repeated until the user selects another key on the keypad.

14. The method of claim 12, wherein the cycle key comprises a "#" key.

15. The method of claim 12, wherein the decision tree comprises only entries of n-grams that have a non-zero probability.

16. The method of claim 12, wherein the decision tree comprises a plurality of n-gram/key combinations.

17. The method of claim 12, wherein the characters presented in (f) and (g) are presented via a voice prompt and not via a visual display.

* * * * *